United States Patent
Rameshni et al.

(10) Patent No.: US 9,617,154 B1
(45) Date of Patent: Apr. 11, 2017

(54) SUPERDEGAS—A PROCESS OF INTEGRATING SULFUR COLLECTION AND DEGASSING FOR ZERO EMISSION

(71) Applicants: Mahin Rameshni, Monrovia, CA (US); Stephen L. Santo, La Crescenta, CA (US)

(72) Inventors: Mahin Rameshni, Monrovia, CA (US); Stephen L. Santo, La Crescenta, CA (US)

(*) Notice: Subject to any disclaimer, the term of this patent is extended or adjusted under 35 U.S.C. 154(b) by 0 days.

(21) Appl. No.: 14/870,017

(22) Filed: Sep. 30, 2015

(51) Int. Cl.
| | |
|---|---|
| *C01B 17/02* | (2006.01) |
| *C01B 17/04* | (2006.01) |
| *B01D 19/00* | (2006.01) |
| *B01J 31/02* | (2006.01) |

(52) U.S. Cl.
CPC ...... *C01B 17/0447* (2013.01); *B01D 19/0042* (2013.01); *B01D 19/0073* (2013.01); *B01J 31/0271* (2013.01); *C01B 17/0426* (2013.01); *B01J 2231/62* (2013.01); *B01J 2531/002* (2013.01)

(58) Field of Classification Search
CPC .. C01B 17/02; C01B 17/0232; C01B 17/0248
See application file for complete search history.

(56) References Cited

U.S. PATENT DOCUMENTS

| | | | | |
|---|---|---|---|---|
| 5,004,591 A | * | 4/1991 | Maurice | C01B 17/0232 423/578.1 |
| 5,030,438 A | * | 7/1991 | Voirin | C01B 17/0232 423/265 |
| 2014/0065057 A1 | * | 3/2014 | Metheral | C01B 17/0232 423/578.1 |
| 2016/0236935 A1 | * | 8/2016 | Metheral | C01B 17/0232 |

* cited by examiner

*Primary Examiner* — Timothy Vanoy

(57) ABSTRACT

A process is provided for liquid sulfur degasification in an underground container, comprising: collecting liquid sulfur which contains polysulfides and hydrogen sulfide in a first compartment of the underground container; agitating and creating turbulence in the liquid sulfur in the first compartment of the underground container; transferring the liquid sulfur into a second compartment of the underground container; injecting gas into the liquid sulfur into the second compartment of the underground container via gas spargers, and also injecting morpholine catalyst into the liquid sulfur in the second compartment of the underground container to produce a degassed liquid sulfur; and transferring the degassed liquid sulfur into a third compartment of the underground container for storage and subsequent removal.

14 Claims, 4 Drawing Sheets

SUPERDEGAS—A PROCESS OF INTEGRATING SULFUR COLLECTION AND DEGASSING FOR ZERO EMISSION

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

This disclosure relates generally the integration of sulfur collection and degassing to Process the produced liquid sulfur from any type of sulfur recovery unit for collection of liquid sulfur and removal of polysulfides and hydrogen sulfide (H2S) and related gases by degassing liquid sulfur using combination of air spargers, catalyst and agitator. More specifically, the inventions disclosed herein are related to processes for the collection of liquid sulfur that is produced in a Claus unit or similar sulfur recovery unit and then degassing the sulfur at any pressure with the minimum residence time and storing and transferring the liquid sulfur produced, in an underground container system achieving zero emission so called SuperDegas.

The new invention SuperDegas consists of at least 3 compartments in underground sulfur container as a concrete pit or as a carbon steel vessel in the concrete pit to provide (section 1) entrainment and enough agitation in the liquid sulfur using vertical pumps, (section 2) degassing occurs in the new method using proprietary air spargers and Morpholine catalyst, (section 3) to store and transfer degassed sulfur to storage or other facility. The definition of the new invention is to integrate the sulfur collection with the degassing system meaning the sulfur will be degassed during the collection and further degassing occurs by the methods are described in this invention.

DESCRIPTION OF THE RELATED ART

Currently all the sulfur plants around the world are designed to have the produced sulfur flows by gravity to the underground sulfur pit. The sulfur has to be degassed before sulfur transport to other facilities as liquid or solid.

The current commercial technologies offers the sulfur degassing inside of the sulfur pit with extended residence time of minimum 16 hours to 24 hours or even 30 hours; since achieving 10 ppmw or more of H2S in the liquid sulfur is very difficult as the results the sulfur plant with large capacities will have a very large sulfur pit where it becomes expensive and not practical. The sulfur degassing also may occur outside of the pit, using the liquid degassing like DEGASS™ or AMOCO by providing an additional column containing packing or Claus catalyst where due to sulfuric acid formation the material construction of these columns has been upgraded several times to titanium or even higher metal grade to overcome the corrosion and becomes very expensive. There are many units in operation using external column having difficulty with severe corrosion and they are required to upgrade or replace the column and they had to shut down the column degassing.

The Claus process is a well-known process for producing elemental sulfur by reacting hydrogen sulfide and sulfur dioxide. Typically, hydrogen sulfide in refinery or gas plant or sour gas field developments or any other facilities product gases is partially combusted to produce sulfur dioxide, which then reacts with the unburned hydrogen sulfide to yield sulfur and water. The sulfide is condensed and recovered. Suitable catalysts may also be used to promote the sulfur production.

The basic chemistry of the Claus process is as follows:

$$H2S + 3/2 O2 \rightarrow SO2 + H2O \tag{1}$$

$$2H2S + SO2 \rightarrow 3/8 S8 + 2H2O \tag{2}$$

Hydrogen sulfide is soluble in liquid sulfur. The dissolved hydrogen sulfide may react with the sulfur di-radical chain species to form hydrogen polysulfides, as follows:

$$H2S + Sx-1 \rightarrow H2Sx \tag{3}$$

The conversion rate of hydrogen polysulfide back to hydrogen sulfide is generally very low.

Hydrogen polysulphides are insidious for a couple of reasons:

(a) Natural decay results in the gradual evolution of H2S, invariably accumulating to dangerous levels. H2S is toxic at 70 ppmv, and lethal at 600 ppmv. Lower explosive limits (LEL) range from 3.5%-vol in air at 150° C. to 4.3%-vol at 20° C., with a relatively low auto-ignition temperature achievable by, for example, a static electric spark—not unlikely since sulfur is a poor electrical conductor.

(b) Polysulphide decomposition is accelerated by agitation and exposure to air, as during pumping and transport.

Truck and railcar vapor space H2S levels as high as 7000 ppmv have been measured during loading of un-degassed sulfur, and are invariably above the LEL at the delivery point. Tests by Elf Aquitaine (SNEA) in the 1960's concluded that 15 ppmw is the upper acceptable limit for total H2S in liquid sulfur to ensure H2S levels safely below the 4.3%-vol LEL in the vapor space of transportation tanks. On that basis, industry has generally adopted a 10 ppmw H2S degassing target.

While safety is the primary driver for degassing, friability of solid sulfur formed from un-degassed sulfur is generally much higher, resulting in more sulfur fines and dust during handling and shipping, and continued evolution of minor H2S during solid storage generates nuisance odors.

One problem associated with the Claus process is the presence in the produced liquid sulfur of dissolved hydrogen sulfide. The liquid sulfur removed from the process gas stream in each condenser will contain dissolved H2S in the form of hydrogen polysulfide (H2SX) and H2S in equilibrium with the process gas. If this dissolved H2S is not removed, it will evolve from the sulfur product during storage and/or transport creating potentially hazardous conditions. Degassing the sulfur to reduce the H2S content considerably reduces the potential hazards, and also improves the performance of sulfur forming and grinding processes. Some degassing processes involve agitation of the liquid sulfur and removal of the evolved H2S with a sweep gas.

Stripping normally bases the pit sweep air rate (which may include degasser stripping air) on 0.5-2%-vol H2S in the effluent assuming evolution of 300 ppmw H2S. Generally air is used as the sweep gas since oxygen helps to release the H2S from the polysulfide molecule. The main parameters are taken into consideration for the sulfur degassing are the total H2S and hydrogen poly sulfide content in the sulfur to be degassed and the properties of these components are dissolved in the sulfur. The hydrogen sulfide contaminates the products and may pose serious hazards. For example, molten sulfur from conventional sulfur recovery sources may typically contain as much as 700 parts per million by weight (ppmw) of H2S and hydrogen polysulfides. At these levels, hydrogen sulfide may create nuisance odors in the vicinity of the liquid sulfur, and may also reach toxic levels when loading and unloading the sulfur. Furthermore, when storing liquid sulfur in tanks or other vessels, a threat exists that the lower explosive limit of hydrogen sulfide versus sulfur gas may be reached.

When sweep air is vented to the incinerator excessive sweep rates should be avoided to limit the contribution of sulfur vapor losses to emissions. Steam is generally considered to be a more effective stripping gas than nitrogen, but is also reportedly prone to corrosion. In the case of Claus tail gas, associated H2S renders the approach to free-H2S equilibrium particularly important to meet 10 ppmw H2S in the sulfur.

Typically, sulfur produced from a Claus sulfur plant may contain from about 150 to about 450 ppmw (weight parts per million) of hydrogen sulfide which may evolve with time in the storage facilities such as pits, vessels, tanks, tank trucks, and/or tank cars and accumulate in the vapor phase creating unsafe conditions. For instance, hydrogen sulfide can escape out of the storage device resulting in a release to the atmosphere. Hydrogen sulfide in the vapor phase of a storage device may build up to a level exceeding its lower explosive limit and cause an explosion. Sulfur storage explosions have occurred in the industry.

To eliminate these and other problems, a number of methods have been suggested or developed that remove hydrogen sulfide from liquid sulfur. Release of dissolved hydrogen sulfide has been carried out by agitating the liquid sulfur by various means, such as by mechanical agitating means, spraying means, by bubbling air through the liquid sulfur, and by circulating the sulfur over a stripping column. The released hydrogen sulfide is often removed from the pit gas space by a sweep gas, which typically may be any suitable inert gas such as air, Claus tail gas or nitrogen.

The U.S. Pat. No. 7,927,577 B2, dated 2011 by M. Rameshni describes the sulfur degassing by using jet pump or eductor in each sulfur line to create agitation before entering an above-ground pit while this scheme helps with agitation while there is still requirements of residence time to achieve the specification of H2S 10 ppmw in the degassed liquid sulfur where above ground carbon steel vessel becomes expensive and in some cases may not be practical. In addition, it is normal industry practice to have produced liquid sulfur flows by gravity to an underground container not above ground.

U.S. Pat. No. 5,080,695 ('695), issued in 1992 to Kassarjian, describes a method of removing hydrogen sulfide from liquid sulfur wherein the liquid sulfur is caused to flow continuously through a seal pot where it is contacted by a counter-flowing inert gas, thereby stripping hydrogen sulfide from the sulfur. The inert gas which is typically, nitrogen flows back to the Claus process. One problem with the method of the '695 patent is that selection of degassing agent is restricted to inert gases which have been demonstrated to be less effective degassing agents than oxygen containing gas streams, such as air. Since the spent gas is returned to the process in the '695 patent, an oxygen containing gas, such as air, could not be used because of safety concerns.

It is a disadvantage of some modern, commercial degassing processes that they require large, complex and, accordingly, expensive equipment. For example, in one process, known as the 'Shell process,' degassing takes place in a storage tank or sulfur pit equipped with vertical stripping columns, where liquid sulfur is vigorously agitated by bubbling sparged air through the column at atmospheric pressure in order to induce sulfur recirculation. The stripping columns are open at their tops and bottoms to allow the sulfur to circulate at a rate of a few hundred times per hour. The bubble air, together with an additional flow of air, is then used as a low pressure sweep gas to displace the gases produced by the de-gasification process. The low pressure gases so produced are then fed to an incinerator where the H2S is oxidized to SO2 and released to the atmosphere.

Depending on the design, a liquid or gaseous catalyst, such as ammonia, ammonium thiosulfate, urea, has been used for accelerating the decomposition of the polysulfide into H2S which has been creating plugging and significant impact on the sulfur quality which would not pass the quality test.

SuperDegas introduces the Morpholine catalyst to promote the degassing without any impact on the sulfur quality because the catalyst is evaporated very quickly in the degassing compartment and it is environmentally safe.

U.S. Pat. No. 5,632,967 to Goar, Allison & Associates describes what is known in the industry as the "D'GAASS" process. This patent discloses a process for degassing liquid sulfur under pressure. According to the specification, a stream of liquid sulfur containing polysulfides and hydrogen sulfide and a stream of an oxidizing gas are introduced into a vessel and intimately mixed to provide intimate contact between the two streams. The streams are passed through the vessel at a pressure of at least about 40 psig and at a temperature and for a residence time sufficient to remove substantially all of the polysulfides and hydrogen sulfide from the liquid sulfur.

An alternative process, described by the Societe Nationale Elf Aquatane and known as the 'SNEA process', utilizes the catalytic decomposition of polysulfide using a variety of heterocyclic amines and an optional surfactant, as described in U.S. Pat. Nos. 4,849,204; 5,004,591 and 5,030,438. In this process, degassing takes place by repeated circulation and spraying of the liquid sulfur into the sulfur pit. Release of dissolved H2S is achieved by spraying liquid sulfur through jets at a specific velocity. Ammonia, injected at the suction of the recirculation pump, is typically used as a catalyst. After the H2S gas is released, it is removed by a sweep gas and fed to an incinerator. Both the stripping columns used in the Shell process and the circulation/spraying equipment used in the SNEA process are costly and require a large amount of space. Further, it is a disadvantage of both processes that they require the additional step of having to incinerate the H2S-containing sweep gases. In recent years, the catalyst used in this process are not allowed to be used by many countries around the world in regard to human safety and environmental regulations.

Other processes which have been described include the use of a fixed-bed alumina, solid catalysts impregnated with an inorganic metal sulfide, or a cobalt-molybdenum impregnated alumina catalyst to catalyze the oxidation of polysulfide in combination with air-stripping.

It is another disadvantage of modern, commercial degasification processes that they require a relatively long retention time in the sulfur pit. For example, the Shell process described above typically requires the liquid sulfur to be recirculated through the stripping columns for about twenty to about twenty-four hours, while the SNEA process typically requires the liquid sulfur to be recirculated through the spray jets for about twenty-four to about thirty hours.

Presently, most industrial facilities remove hydrogen sulfide from the liquid sulfur by injecting a gas, such as air, nitrogen and steam in the pit where liquid sulfur is stored. Some have installed elaborately designed nozzles inside the pit for dispersing the gas into the pit without any reduction in the residence time.

However, installation or replacement of air sparging or mixing equipment in a storage device such as a pit requires emptying out the entire is sulfur inventory. This typically requires shutting down the entire sulfur unit for several days because of the highly corrosive and pyrophoric environment in the pit. The pit should be depleted of any sulfur and made safe before human personnel may enter and make the installation. Other problems exist with known methods for reducing the amount of hydrogen sulfide in liquid sulfur.

The inventions disclosed and taught herein are directed to an improved system for liquid sulfur collection from process gas streams with a degassing process.

All above degassing processes described above have common problems of significant residence time in the pit while the 10 ppmw of H2S may not even be achieved and outside of the pit degassing also requires column with exotic material and in most cases of current operation corrosion is the main issues.

In accordance with the present disclosure relates to processes for collecting sulfur from sulfur recovery processes and process gas streams, such as from Claus-type plants, using integrated sulfur collection and degassing techniques.

An under-ground sulfur container as a pit or vessel comprises of at least three compartments whereas consists of (1) sulfur collection before degassing and it is equipped with a minimum one vertical sulfur pump, (2) sulfur degassing compartment consists of proprietary air spargers and catalyst called Morpholine to improve the degassing time, (3) the last compartment is degassed sulfur storage with at least one vertical sulfur pump to transfer to the other facility, whereas the current innovation process is called SuperDegas and the sulfur contains much less than 10 ppmw of H2S in degassed sulfur.

BRIEF SUMMARY OF THE INVENTION

In accordance with a first aspect of the present disclosure, a method for the removal of hydrogen sulfide from a liquid sulfur stream is described, wherein the method comprises collecting the liquid sulfur streams from one or more sulfur condensers combines into a header through the sulfur seal or Sultrap or equivalent where sulfur from the header flows to the sulfur cooler if necessary and then is collected in the first compartment of the under-ground sulfur container like a concrete pit or a carbon steel vessel inside of the pit. While pre-cooling the sulfur to 130-145° C. slightly increases the solubility of free H2S, the greater benefit is increased O2 (or SO2) solubility, since the oxidant must first dissolve in the sulfur in order to be available for reaction with H2S.

In accordance with a second aspect of the present disclosure, the first compartment is equipped with at least one vertical sulfur pump to pump the sulfur to the second compartment. The purposes of having the pump are to create agitation, turbulent and higher velocity that promotes intimate gas/liquid contact, and also creates shear forces conducive to the mechanical breakdown of the polysulphide chains, and second to operate the degassing at a higher pressure for a better degassing and also having enough pressure to send the sulfur pit vent to the front of the sulfur plant to the reaction furnace to reduce the emission instead of sending to the incinerator, and third if the second compartment requires maintenance or repair the sulfur can be stored in the collection section for a short time.

Furthermore; in the present innovation SuperDegas, the second compartment comprises the proprietary air spargers and the Morpholine catalyst to promote the speed of the degassing to a minimum residence time.

The SuperDegas consists of an internal container as a pit or a vessel where the sulfur degassing technology occurs in the second compartment and employs proprietary air sparging nozzles which pull the liquid sulfur through the nozzles, and mixing the sulfur with very small air bubbles, providing a high bubble surface area to volume ratio effectively increasing mass transfer of H2S while providing liquid agitation in the liquid inventory. The nozzles are strategically placed at the bottom of the sulfur container pit or vessel. Air for the spargers is provided from the plant air system at high pressure or from the air compressor. A steam eductor is provided to evacuate the evolved H2S from the vapor space in the pit such that the H2S concentration remains well below the low explosion limit (LEL) of 3.5%.

Proper design of the sulfur container a concrete pit is very critical and some locations have difficulty with soil quality. Pit concrete walls invariably develop cracks, particularly in the case of substandard design or construction, which is not uncommon. Sulfur will migrate into the crack up to the point that the temperature has dropped below the freeze point. The cooler section of the crack will contain moisture and air. Once changes in the temperature gradient across the wall, for whatever reason, result in <40° C. at the sulfur interface, bacteria (thiobacillus oxidant) become established. Thiobacilli gain energy by oxidation of sulfur to sulfuric acid and require O2, H2O and micro-nutrients for ideal growth. Some of the energy arising from sulfur oxidation is used to fix CO2 for carbon metabolism. The bacteria grow optimally in the 25-30° C. range but are inactive below 5° C. and, although they are killed above 40° C., they will lie dormant below 0° C. for considerable periods. Subsequent temperature fluctuations marginally >40° C. will kill some of the bugs, whose corpses become nutrients for the survivors.

The bottom line is rather than simply sealing the crack as might be assumed, sulfur migration invariably invites acid attack from within the concrete wall.

Groundwater incursion is another very common problem. Water migrating inward through cracks ultimately flashes at some point, causing severe erosion. And that is only half the problem. Resultant steam in the sweep air (from coil leaks as well as groundwater) causes rapid sulfurous acid corrosion of any carbon steel surface sufficiently cool for moisture to condense. Unless ambient sweep air is preheated, which is not normally the practice, condensation invariably occurs at some areas of not only pit/tank roofs, but downstream piping.

As described having a carbon steel vessel with a reasonable size and reasonable residence time is the clear answer to facilities that having problems with the concrete pit where the SuperDegas disclosed the new innovation and taught that SuperDegas is the ultimate answers and solutions.

In addition, according to the current innovation of SuperDegas, Morpholine is the sulfur degassing catalyst is used to reduce the residence time. This liquid catalyst is an amine type where will reduce the residence time to less than one hour and would not have impact on the sulfur quality and environmentally friendly, and most importantly most of the residual catalyst is removed by the stripping air. The catalyst is a common amine readily available from most chemical suppliers. Residual catalyst in the product sulfur is typically <0.5 ppmw.

The operating test data shows Morpholine degas the liquid sulfur 30 times faster than Quinoline with sparging air.

The best form of sulfur is polymeric sulfur where sulfur will be in a stable condition. The operating test data shows that within one hour the catalyst will be evaporated in the second compartment of the sulfur container a pit or a vessel and the sulfur will be in polymeric stable form within one hour residence time therefore, Morpholine will be removed from the sulfur and the quality of the sulfur would not be impacted. The degassed liquid sulfur contains less than 10 or even 5 ppmw of H2S.

The commercial technologies who are using only air sparger in the pit requires 16-30 hours residence time and having difficulty to meet 10 ppmw of H2S in most cases.

Another embodiment of the present invention; the commercial technologies are using the other catalysts that are not successful. Fixed beds of Claus catalyst (activated alumina) are employed to a limited extent. More common—and controversial—are liquid catalysts such as ammonia, ammonium salts (e.g. ammonium thiosulfate), and some like Quinoline are not allowed due to toxicity and the environmental regulations like Elf Aquitaine (SNEA).

Many conclude from experience that small quantities of residual ammonia based catalyst can result in downstream salt deposition, corrosion and other problems. Examples cited include increased plugging of acid plant sulfur burners, salt buildup in transportation tanks with increased tare weight, fouled heat transfer surfaces and increased friability of formed solid sulfur. It is not clear to what extent such problems may be attributable to overdosing of those catalysts.

In accordance with other aspect of SuperDegas innovation, the third compartment is the storage section of the degassed sulfur comprises a minimum of one vertical sulfur pump to transfer the degassed sulfur to other facilities.

In accordance with aspect of SuperDegas the underground container refers a concrete pit or a carbon steel vessel inside of the underground concrete pit unless stated otherwise.

The new innovation SuperDegas disclosed an integration system consisting of sulfur collection, degassing, and storage and transfer and has the following advantages:

(1) In accordance with the first aspect of SuperDegas innovation; the sulfur container is an underground concrete pit or carbon steel vessel that consists of at least three compartments; sulfur collection with pumps for agitation of liquid sulfur, to increase sulfur pressure, and to provide more flexibility of maintenance of degassing compartment, the second compartment is a unique degassing process combination of a proprietary spargers and Morpholine, and the third compartment is to store and transfer using pumps. All the commercial sulfur pit degassing technologies have one degassing and storage compartments with no flexibility.

(2) In accordance with the second aspect of SuperDegas innovation; it is economical to have the sulfur pit as concrete or carbon steel vessel inside of the pit due to reduction of the residence time for sulfur degassing from 16-30 hours to only within one hour. All the commercial sulfur pit degassing technologies has to use concrete pit due to requirements of the large residence time unless the sulfur degassing take place in external column outside of the pit with expensive material which requires higher capital cost investment otherwise having the additional carbon steel pit, make to process very un-economical.

(3) In accordance with the third aspect of SuperDegas innovation; this technology can be used in revamp projects for the capacity expansion projects where it is not possible to use the existing pit to achieve 10 ppmw of H2S because the additional capacity will reduce the original residence time further down and will increase the H2S in the liquid sulfur. By keeping the existing pit and having the new proprietary air spargers and Morpholine catalyst the sulfur specification of less than 10 ppmw is maintained with the minimum capital cost.

4) In accordance with the forth aspect of SuperDegas innovation; the combination of the air spargers design and Morpholine catalyst reduces the required residence time from 16-30 hours to only within 1 hour without impacting on the sulfur quality.

(5) In accordance with the fifth aspect of SuperDegas innovation; the pit vent from the degassing compartment of the sulfur pit can flow to the incineration or it can recycle back to the reaction furnace in the sulfur recovery unit to achieve zero emission. While the adequate pressure is available.

(6) In accordance with the sixth aspect of SuperDegas innovation; the Morpholine catalyst do not have any impact on the sulfur quality since within one hour the catalyst will be evaporated and swept with air in the second compartment of the sulfur pit and the sulfur will be in polymeric stable form where we need only within 1 hour residence time therefore, Morpholine will be removed from the sulfur and the quality of the sulfur would not be impacted. While all other commercial catalyst have impact on the sulfur quality, or will cause plugging through the pipe or it is not safe according to the environmental regulations of many countries these solvents are not permitted to use anymore.

(7) In accordance with the seventh aspect of SuperDegas innovation; the degassed liquid sulfur contains less than 10 ppmw of H2S, and according to the operating data less than 5 ppmw of H2S is achieved while none of the commercial degassing can achieve such target.

(8) In accordance with the eighth aspect of SuperDegas innovation; the sulfur container is equipped with at least two temperature indicators—one below the low-low sulfur level to indicate sulfur temperature, and one in the vapor space near the sweep air outlet to detect a sulfur fire. Also provided is a vapor-space H2S monitor. While the primary function is to alert the operator to high H2S levels resulting from reduced sweep rate, it can also serve as basis for reducing the sweep rate if necessary to reduce incinerator emissions resulting from excessive sulfur vapor losses.

(9) In accordance with the ninth aspect of SuperDegas innovation; the pit vent eductor sizing is based on sparging air rate plus sweep air rate. Alternately, a steam jacketed inductive blower may be specified in lieu of a steam eductor to evacuate the system. Air is normally supplied by a dedicated air compressor or from the facility plant air system, if available. If utility plant air is utilized, a knockout drum is recommended to prevent condensed liquid water from entering the storage pit. Air sweep is inherently more effective in a horizontal cylindrical steel vessel, whose geometry results in a closer approach to plug flow.

(10) In accordance with the tenth aspect of SuperDegas innovation; a portion or full stream of the tail gas stream from the SRU can be used as a sweeping agent where the pit vent can be recycled to the tail gas unit.

(11) In accordance with the eleventh aspect of SuperDegas innovation; the pit vent flows to the incineration system, or recycles to the reaction furnace in the SRU, or recycles to the tail gas treating unit; the option depends on the emission limit regulations.

(12) In accordance with the twelfth aspect of SuperDegas innovation; if carbon steel vessel is selected inside of the pit, external heating system can be used instead of internal heating coil. Internal heating coils are one of the main causes of fire if they are corroded, and making them from stainless steel is highly recommended.

(13) In accordance with the thirteenth aspect of SuperDegas innovation; there are many locations around the world that due to soil quality and Groundwater incursion having difficulty with under-ground concrete pit. Having carbon steel vessel inside of the pit is very expensive if the degassing requires long residence time of 16-30 hours. SuperDegas is break through innovation for cutting the residence time to about within 1 hour which makes the use of the carbon steel vessel very doable and economical.

(14) In accordance with the fourteenth aspect of SuperDegas innovation; the sulfur temperature shall be maintained at 130-145° C. by using external sulfur cooler or internal cooling using the cooling coils where the proper design required to maintain the temperature within internal heating coils and internal cooling coils inside of the pit. For the vessel the temperature shall be maintained within the inside cooling coils and the outside heating elements.

BRIEF DESCRIPTION OF THE DRAWINGS

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

The following figures form part of the present specification and are included to further demonstrate certain aspects of the present invention. The invention may be better understood by reference to one or more of these figures in combination with the detailed description of specific embodiments presented herein.

Figure 1:
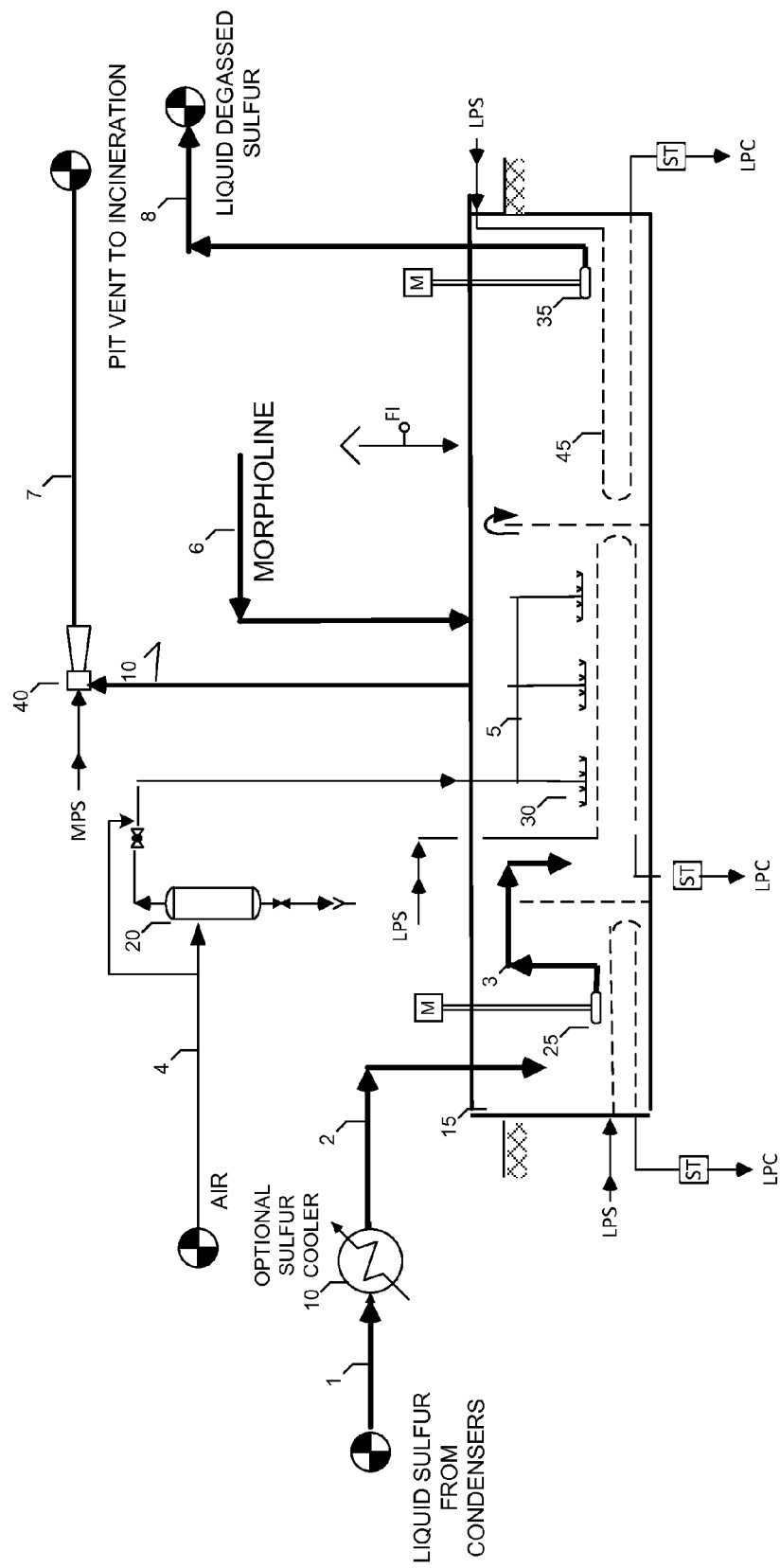
FIG. 1 illustrates a sulfur collection and degassing process of SuperDegas in a concrete under-ground pit and in accordance with an embodiment of the present disclosure where the pit vent flows to the incineration or thermal oxidizer system.

An eductor is used to sweep the vapor containing H2S by using air or using portion or full stream of the tail gas feed stream from the sulfur recovery unit.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new processes SUERDEGAS for the liquid sulfur degassing inside of the collection pit with significant reduced residence time compare to the commercial processes and with significant reduced H2S in the degassed liquid sulfur compare to the commercial processes have difficulty to meet 10 ppmw of H2S in the liquid sulfur while using much higher residence time and more capital cost investment. SuperDegas process uses proprietary air sparger plus Morpholine catalyst with less residence time and by recycling the vent gas to the reaction furnace to achieve zero emission with lower capital cost investment for new facilities and also for the revamp of the existing facilities.

The present invention relates to processes for recovering sulfur for onshore and offshore applications; refineries, gas plants, IGCC, gasification, coke oven gas, mining and minerals sour gas field developments and flue gas desulfurization onshore and offshore wherein sulfur recovery unit is required for new units or revamps.

In accordance with aspects of the present invention, it is an object of the present disclosure to provide a process for the liquid sulfur degassing economically acceptable for, present day industrial operations and higher safety standard.

Another object is to provide such a process which can tolerate variances in operating conditions within a given range without major equipment adaptations. A further object is to provide a process which can be utilized in co-acting phases to provide, at acceptable economics, the capacity required in present-day industrial operations, easy to operate and more reliable and robust operation.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, heating and cooling of the process streams are known to those of skill in the art, and may be employed in the processes of the present invention, without deviating from the disclosed inventions.

As indicated above, in typical operations involving sulfur recovery, the liquid sulfur from the sulfur condensers are normally collected through the sulfur seal to the underground sulfur pit. Then the sulfur is degassed inside of the pit to remove the H2S and then is transferred to the storage tank for sulfur forming/solidification or is sold in the liquid form. Applicants have created processes for collecting liquid sulfur and sulfur degassing the sulfur, wherein the processes disclosed herein have numbers of advantages over previously known and/or practiced degassing technologies associated with sulfur recovery technologies.

All the heat exchangers defined in this process can be of any type of commercial exchangers such as but not limited to shell and tube, plate and frame, air cooler, water cooler, boiler type, heating and cooling coils or any suitable exchangers.

The pumps and eductors defined in this process can be any type of commercial pumps suitable for sulfur handling inside of the pit or vessel and eductors can be any type of commercial eductors, ejectors, and blowers.

Turning to FIG. 1 of the SUPDEDEGAS process; the liquid sulfur stream from one or more sulfur condensers, which may come from a variety of sources such as from a Claus process or the like are collected in stream (1) through the sulfur seal or similar to the underground the first compartment of the sulfur pit. If external cooling is applied to maintain the sulfur temperature then the cooled sulfur (10) outlet stream (2) flows to the first compartment of the sulfur pit (15). As mentioned above, the sulfur cooler can be internal cooling systems like cooling coils suitable for this application.

As shown in the FIG. 1, the sulfur pit (15) is equipped with the heating coils at the bottom (45) to keep the liquid sulfur at the reasonable temperature suitable for degassing and to prevent solidification by using low pressure steam.

The first compartment of the sulfur pit (15) is equipped with at least one vertical pump (25) inside of the pit to agitate the liquid sulfur and also to increase the pressure which also creates velocity and turbulent of the liquid sulfur and promotes the separation of dissolved H2S from the liquid phase to the vapor phase and finally provides an additional storage during short maintenance of other compartment which none of the commercial degassing processes provides such flexibility.

The liquid sulfur stream (3) from the first compartment through the pump (25) flows to the second compartment where the degassing of the liquid sulfur takes place. This section consists of the air spargers (30) and the Morpholine catalyst injection stream (6) to promote fast degassing within 1 hour. The air stream (4, 5) to the sparger is supplied from the air compressor or the plant air if available at the minimum pressure of 5 barg through air drum (20). Number of spargers depends on the sulfur capacity that required degassing.

In SuperDegas process Morpholine catalyst degas the liquid sulfur 30 times faster than Quinoline or any other solvent with sparging air and 1 hour residence time from 16-30 hours and to meet less than 10 ppmw of H2S in liquid sulfur.

The pit vent eductor (40) collects the released H2S stream (10) using sweep air and by using medium pressure steam as the motive fluid. The eductor discharge stream (7) flows to the incineration system to convert all of the H2S to SO2 prior to releasing to the stack.

In addition, since Morpholine is evaporated by the sweep air to the eductor.

The degassed sulfur overflows from the second compartment overflows to the third compartment as the storage where liquid sulfur is pumped via at least one vertical sulfur transfer pump (35) to other facilities as stream (8).

In accordance with aspects of the present disclosure, certain benefits may be associated with the several processes described and illustrated in the figures where some combinations may be used.

Other and further embodiments utilizing one or more aspects of the inventions described above can be devised without departing from the spirit of Applicant's invention. For example, the process may include multiple stages, or may include loops within the process stages described. Further, the various methods and embodiments of the sulfur degassing processes disclosed herein can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the claims.

In accordance to the SuperDegas innovation, the operating pressure of the container is between 0-10 barg (150 psig).

In accordance to the SuperDegas innovation, the agitation of sulfur is to create higher velocity and turbulent with higher pressure takes place in the collection compartment before the degassing compartment.

In accordance to the SuperDegas innovation, the proprietary air spargers can be applied independently and alone to create turbulent for an effective sulfur degassing process with or without using the Morpholine catalyst in the concrete pit or carbon steel vessel.

In accordance to the SuperDegas innovation, an external sulfur cooler exchanger of any commercial type or internal cooling element coils is used to maintain the sulfur temperature of 130-145 C in the concrete sulfur pit.

In accordance to the SuperDegas innovation, if the external sulfur cooler is not used, the internal heating and internal cooling element coils is integrated to maintain the sulfur temperature of 130-145 C in the concrete sulfur pit.

In accordance to the SuperDegas innovation, the number of the proprietary air spargers is the function of the sulfur capacity where a uniform liquid distribution in the container as a pit or vessel is established.

In accordance to the SuperDegas innovation, the sulfur container consists of at least one or more the degassing compartment.

In accordance to the SuperDegas innovation, the air will be bubbled into the liquid sulfur pipe from the bottom using the proprietary air spargers or air distributor inside of the sulfur container a concrete pit or the carbon steel vessel to achieve a good mixing and to separate the H2S from the liquid phase.

In accordance to the SuperDegas innovation, the container of the concrete sulfur pit consists of the internal heating coils in all compartments made out of stainless steel or suitable material.

In accordance to the SuperDegas innovation, the Morpholine catalyst is evaporated in the degassing compartment and it swept by air, nitrogen, or the tail gas stream and flows to the eductor, blower or similar equipment and do not have any impact on the degassed sulfur quality.

Figure 2:
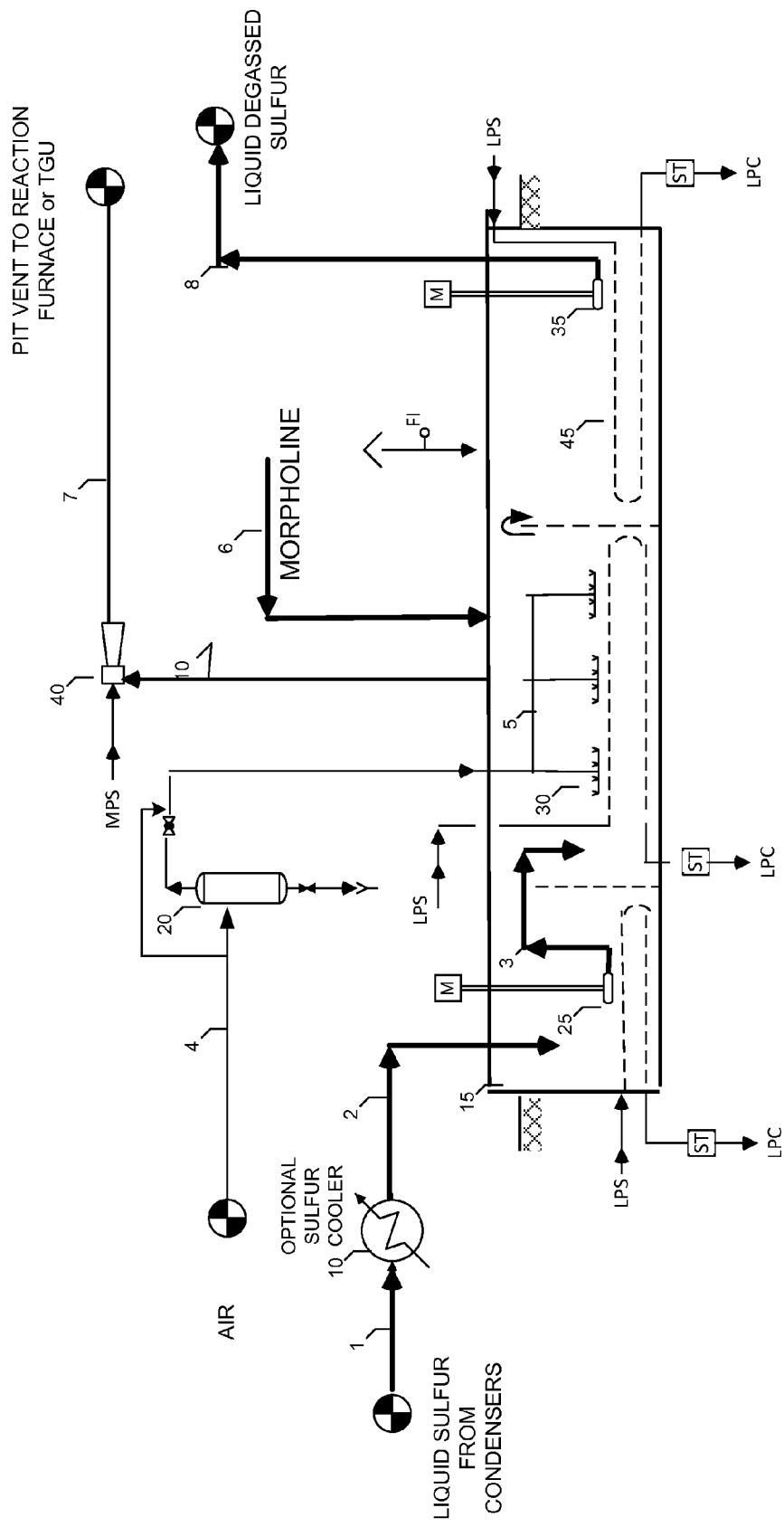
FIG. 2 illustrates a sulfur collection and degassing process of SuperDegas in a concrete under-ground pit and in accordance with an embodiment of the present disclosure where the pit vent recycles back to the reaction furnace or the tail gas unit in the sulfur recovery unit to achieve zero emission.

Turning to the FIG. 2; the description concept of the SuperDegas innovation is the same as FIG. 1 except the pit vent flows to the reaction furnace in the sulfur recovery unit or to the tail gas treating unit to achieve zero emission.

With continued reference to FIG. 2, in accordance with the present disclosure, the liquid sulfur may be degassed using the SRU-tail gas stream. If the SRU tail gas stream is used to sweep the liquid sulfur, the temperature is preferably less than about 145° C. (about 293° F.) and the eductor recycles back to the tail gas unit.

Figure 3:
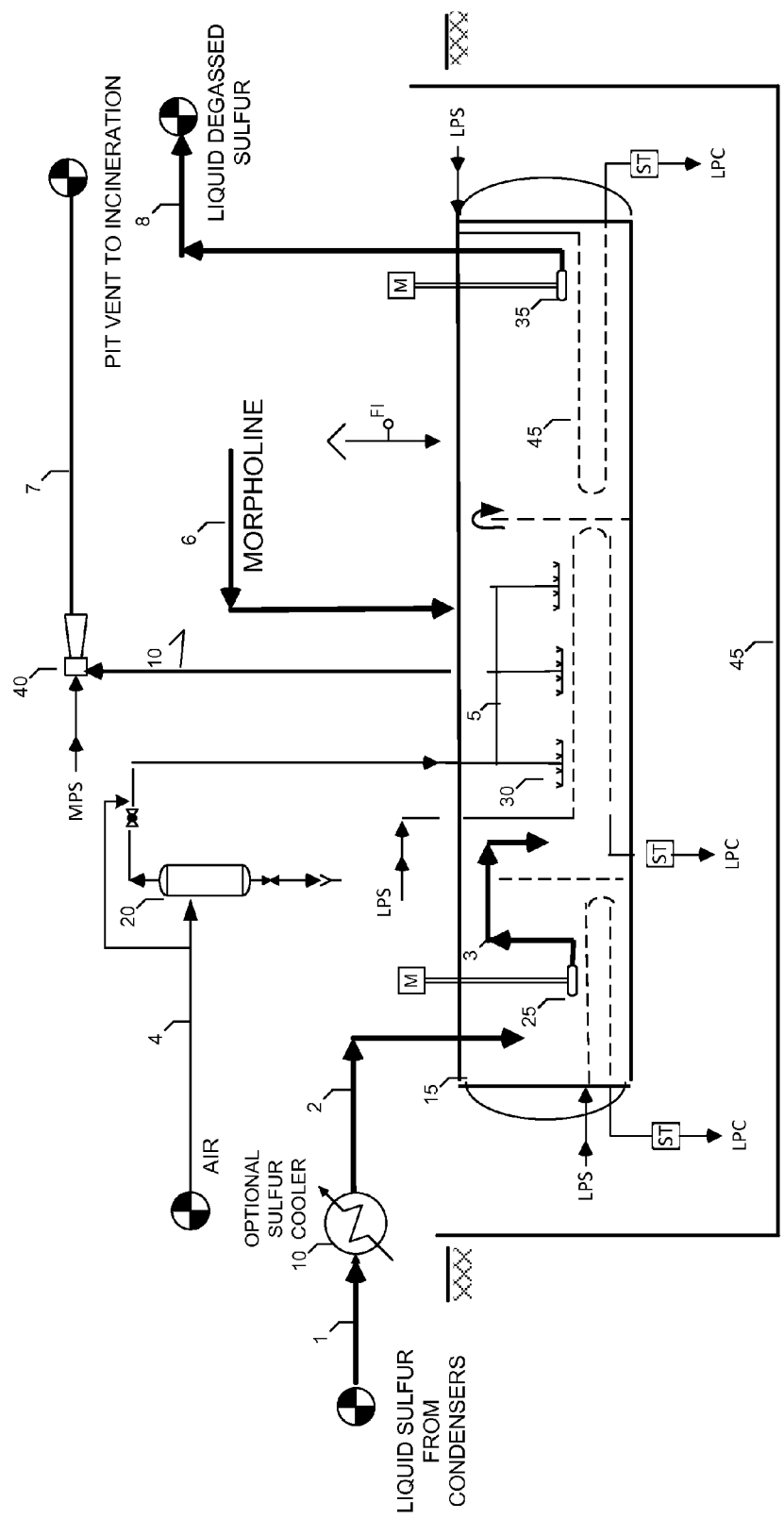
FIG. 3 illustrates a sulfur collection and degassing process of SuperDegas in a carbon steel vessel inside of the concrete under-ground pit and in accordance with an embodiment of the present disclosure where the pit vent flows to the incineration or thermal oxidizer system.

Turning to FIG. 3; the description concept of the SuperDegas innovation is the same as FIG. 1 except a carbon steel vessel is located in the concrete pit where all the actions takes place in the carbon steel vessel instead of the concrete pit unless it is stated separately.

In accordance to SuperDegas innovation, the carbon steel vessel consists of external heating elements around the vessel.

In accordance to SuperDegas innovation, if an external sulfur cooler exchanger is not used then the integrated design of the external heating and internal cooling elements is designed to maintain the sulfur temperature of 130-145 C inside of the carbon steel vessel.

In accordance to SuperDegas innovation, the concrete pit that is holding the carbon steel vessel is equipped for winterization and necessary equipment for a safe operation.

Figure 4:
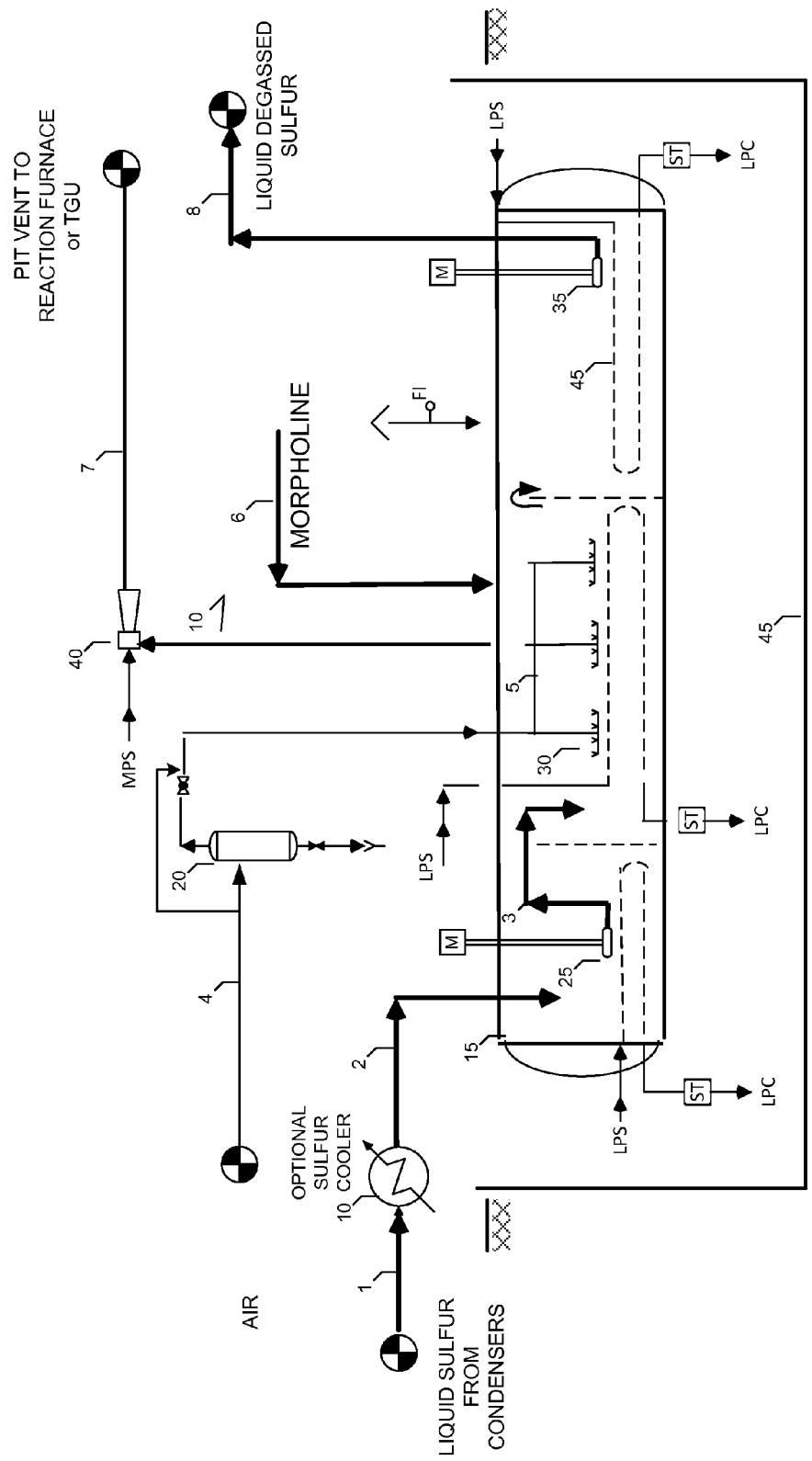
FIG. 4 illustrates a sulfur collection and degassing process of SuperDegas in a carbon steel vessel inside of the concrete under-ground pit and in accordance with an embodiment of the present disclosure where the pit vent recycles back to the reaction furnace or the tail gas unit in the sulfur recovery unit to achieve zero emission.

Turning to FIG. 4; the description concept of the SuperDegas innovation is the same as FIG. 2 except a carbon steel vessel is located in the concrete pit where all the actions takes place in the carbon steel vessel instead of the concrete pit except stated separately.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents.

We claim:

1. A process for liquid sulfur degasification in an underground container, comprising:
   Collecting liquid sulfur which contains polysulfides and hydrogen sulfide in a first compartment of the underground container;
   agitating and creating turbulence in the liquid sulfur in a first compartment of the underground container;
   transferring the liquid sulfur into a second compartment of the underground container;
   injecting gas into the liquid sulfur in the second compartment of the underground container via gas spargers, and also injecting morpholine catalyst into the liquid sulfur in the second compartment of the underground container to produce a degassed liquid sulfur; and
   transferring the degassed liquid sulfur from the second compartment into a third compartment of the underground container for storage and subsequent removal.

2. The process of claim 1, comprising extracting vapor phase out of the underground container with an educator or blower, and transferring the extracted vapor phase to either an incinerator or a reaction furnace.

3. The process of claim 2, comprising extracting the vapor phase out of the underground container with a tail gas stream from a Claus plant, which is used as a sweep gas.

4. The process of claim 1, wherein the operating pressure within the underground container is between about 0 to 10 bar.

5. The process of claim 1, wherein the operating temperature within the underground container is about 130 to 145° C.

6. The process of claim 1, wherein the degassed liquid sulfur contains less than 10 ppmw hydrogen sulfide.

7. The process of claim 1, wherein the underground container contains heating coils or cooling coils in all of the compartments.

8. The process of claim 1, wherein the underground container is made of carbon steel or concrete.

9. The process of claim 1, wherein the underground container is equipped with external heating elements or cooling elements around the underground container.

10. The process of claim 1, wherein a plurality of second compartments are present in the underground container, in which sparge gas is injected into the liquid sulfur and morpholine catalyst is injected into the liquid sulfur.

11. The process of claim 1, wherein the pressure in the gas spargers is at least 5 barg.

12. The process of claim 1, wherein the turbulence in the first compartment is generated by at least one pump.

13. The process of claim 1, wherein the gas is nitrogen, air or tail gas stream.

14. The process of claim 1, wherein the residence time of the liquid sulfur in the second compartment is within one hour.

* * * * *